United States Patent [19]

Buehler et al.

[11] Patent Number: 5,029,276
[45] Date of Patent: Jul. 2, 1991

[54] CIRCUIT ARRANGEMENT FOR FORMING THE DIFFERENCE AND THE SUM OF TWO DETECTED SIGNALS

[75] Inventors: Wolfhardt Buehler, Munich; Hans Poisel, Dachau; Gert Trommer, Munich, all of Fed. Rep. of Germany

[73] Assignee: Messerschmitt-Boelkow-Blohm, Munich, Fed. Rep. of Germany

[21] Appl. No.: 508,296

[22] Filed: Apr. 10, 1990

[30] Foreign Application Priority Data

Apr. 12, 1989 [DE] Fed. Rep. of Germany ....... 3912032

[51] Int. Cl.$^5$ ............................................. H01J 40/14
[52] U.S. Cl. .............................. 250/208.2; 250/214 A
[58] Field of Search ............... 250/208.2, 210, 214 A, 250/214 R; 307/311

[56] References Cited

U.S. PATENT DOCUMENTS

| 4,440,498 | 4/1984 | Sheem. | |
| 4,479,715 | 10/1984 | Sheem. | |
| 4,653,917 | 3/1987 | Moeller et al. | |
| 4,841,138 | 6/1989 | Muro | 250/208.2 |
| 4,902,884 | 2/1990 | Szabo et al. | 250/210 |
| 4,906,836 | 3/1990 | Yamashita et al. | 250/214 A |

OTHER PUBLICATIONS

Optoelektronik, "Integrated Optics for Fiberoptical Sensors", by C. Wulf-Mathies, Laser and Optoelektronik 21(1)/1989, pp. 57 to 63.

Primary Examiner—David C. Nelms
Assistant Examiner—Que T. Le
Attorney, Agent, or Firm—W. G. Fasse; D. H. Kane, Jr.

[57] ABSTRACT

A circuit arrangement for forming the difference and the sum of two detector signals has two photodetectors connected in back-to-back fashion. The difference signal is provided by a first operational amplifier connected to the junction between the two back-to-back connected photodetectors. The sum signal is formed by two further operational amplifiers, whereby one further operational amplifier inverts the signal from one detector and supplies the inverted signal to the input of the other operational amplifier. Thus, the difference signal and the summing signal are directly formed and accessible.

4 Claims, 1 Drawing Sheet

CIRCUIT ARRANGEMENT FOR FORMING THE DIFFERENCE AND THE SUM OF TWO DETECTED SIGNALS

FIELD OF THE INVENTION

The invention relates to a circuit arrangement for forming the difference and the sum of two signals detected by respective separate detectors. Such a circuit is suitable for evaluating, for example, measured electrical signals that are in analog form and must be converted into corresponding digital signals.

BACKGROUND INFORMATION

Signal adding and differentiating circuits are known in various versions. Reference is made, for example, to U.S. Pat. Nos. 4,440,498; 4,653,917; and 4,479,715. Such circuits are also used in the so-called "Sagnac-Interferrometer" employing a fiber optical gyro, whereby a 3×3-coupling device and two or three detectors are used and the output signals are produced as a function of the so-called gyro rate. Reference is further made to an article "Integrated Optics for Fiberoptical Sensors" published in the Trade Journal "Laser and Opto-Electronics", No. 21(I)/1989.

All known circuits of this type, however, have certain disadvantages as will be described below. Known circuits are not capable to permit in a simple manner a direct access to the difference signal and to the sum signal of the two input signal currents. Another drawback of conventional circuits of this type is seen in the fact that they require a substantial effort and expense for the analog-to-digital conversion that follows.

At small gyro-angular rates, the two detectors of a fiber optical gyro with a 3×3-coupler receives signals having signal values corresponding to 20 to 30% of the maximum signal. A precise resolution of small gyro rates thus makes it necessary to achieve a very precise measuring of small changes which are superimposed on a large or high d.c. signal component. Thus, when such signals are digitized, it is necessary that the entire signal is digitized with the precision with which the small signal component is determined, and which small signal component is generated by the gyro rotation. As a result, expensive and high resolution signal converters are required. Additionally, it is necessary to operate the photo-diodes practically in a short-circuit operation in order to evaluate the d.c. signal components because only in this manner it is possible to assure the stability of the zero point or, in other words, the linearity of the signal conversion.

OBJECTS OF THE INVENTION

In view of the foregoing it is the aim of the invention to achieve the following objects singly or in combination:

to provide a circuit arrangement capable of summing and differentiating input signals by simple and inexpensive circuit components with accuracy;

to provide such a circuit which will allow a direct access to the difference signal and to the sum signal of two signal inputs; and to make sure that the measured signal is highly precise, even for very small gyro-angular rates down to zero.

SUMMARY OF THE INVENTION

The foregoing objects are achieved according to the invention in a circuit arrangement in which two detectors are connected in back-to-back fashion so that the currents of these detectors can be subtracted in an operational amplifier, and wherein the output terminals of the back-to-back connected detectors are connected to respective further operational amplifiers of which one output is connected to the input of the other operational amplifiers so that the two further operational amplifiers form the sum signal.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 2:
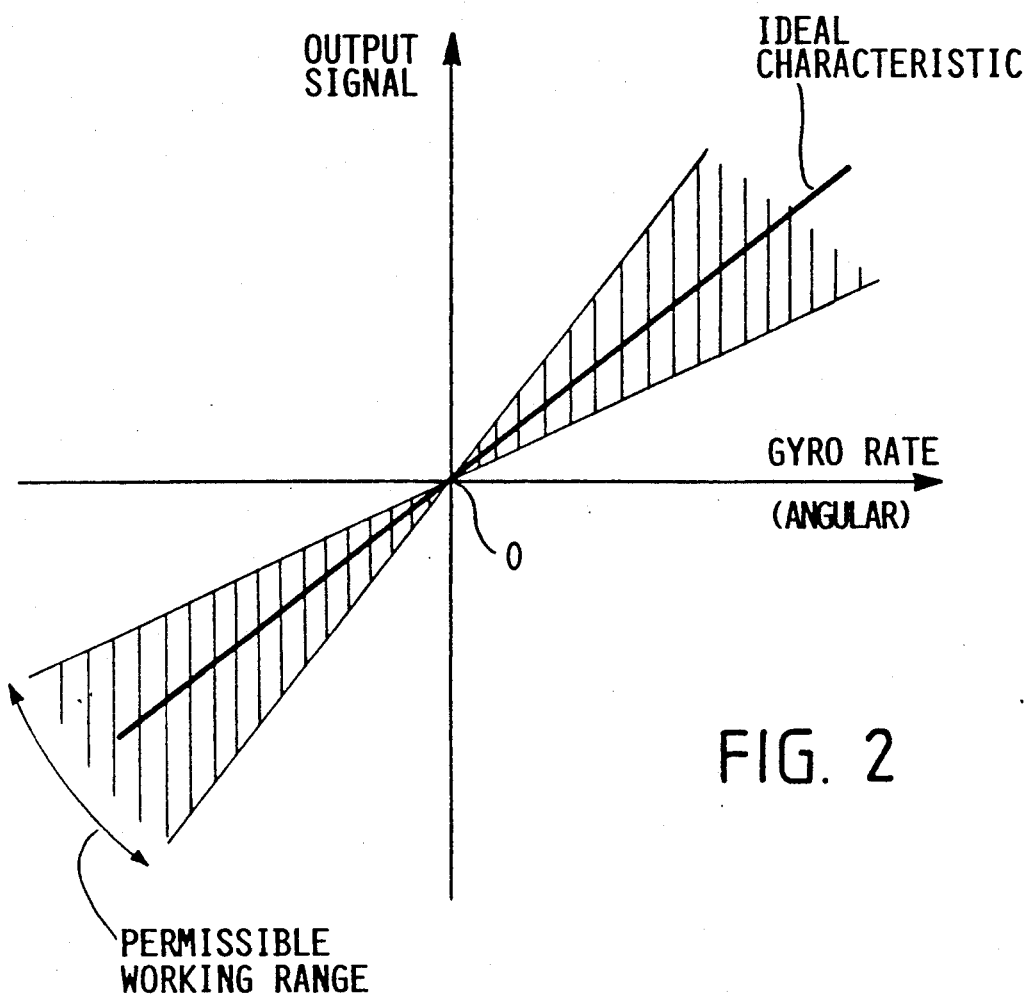
FIG. 2 is a schematic illustration of the measured or output signals as a function of the gyro-angular rate.
Figure 1:
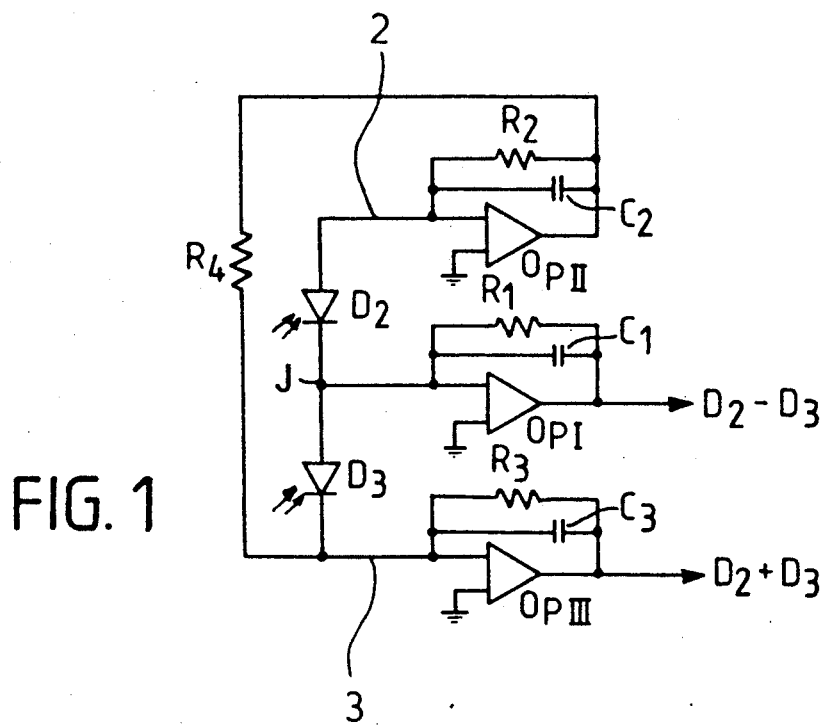
FIG. 1 is a diagram of the present circuit arrangement.

FIG. 1 shows a circuit diagram according to the invention which achieves the above objectives, especially a highly precise measured or output signal even when the gyro-angular rate is zero. At higher angular rates the signal still remains within the field hatched by vertical lines in FIG. 2. The circuit shown in FIG. 1 comprises two sensor diodes $D_2$ and $D_3$ or detectors connected to each other in an anti-parallel or back-to-back fashion. Specifically, the cathode of the first sensor diode $D_2$ is connected to the anode of the second sensor diode $D_3$ to form a junction J which is connected to an input of a first operational amplifier $O_{PI}$ whereby the output signal of the first operational amplifier $O_{PI}$ provides a difference signal corresponding to the difference between the two photo-currents sensed by the photo-diodes $D_2$ and $D_3$. Due to the back-to-back arrangement of the two sensor photo-diodes $D_2$ and $D_3$, any gain errors of the first operational amplifier $O_{PI}$ are compensated and thus do not falsify the offset of the output signal $D_2-D_3$. As a result, the high d.c. component of the two photo-currents is eliminated and the difference value can be digitized with reasonable effort and expense. However, this arrangement also causes the loss of 50% of the information content of the two signals sensed by the two diodes $D_2$ and $D_3$.

In order to compensate for said loss and to obtain the full information content, for example, the sum and the difference of both signals, the anode terminal 2 of the sensor diode $D_2$ is connected to a second operational amplifier $O_{PII}$, while the cathode terminal 3 of the second sensor diode $D_3$ is connected to a third operational amplifier $O_{PIII}$. The second and third operational amplifiers connect the back-to-back circuit of the two sensors to ground, thereby virtually providing a short-circuit. Additionally, the output of the second operational amplifier $O_{PII}$ is connected through a resistor $R_4$ to the input of the third operational amplifier $O_{PIII}$. As a result, the first operational amplifier $O_{PI}$ provides at its output the difference signal $D_2-D_3$, while the output of the third operational amplifier provides the sum signal $D_2+D_3$. The second operational amplifier $O_{PII}$ inverts and amplifies the signal from the detector $D_2$ and supplies it, as mentioned, to the input of the third operational amplifier $O_{PIII}$ for the sum formation. For this operation the resistors $R_2$, $R_3$, and $R_4$ are selected to be equal to each other. These resistors are, for example, in the range of 1 M $\Omega$. The resistor $R_1$ is within the range of 10 M $\Omega$. The capacitors $C_1$, $C_2$, and $C_3$ are within the range of 100 pF.

It is apparent from FIG. 1 that the effort and expense is minimal for realizing the summing and differentiating circuit according to the invention. Such a circuit also minimizes the effort and expense required for digitizing the subtracted and summed signals due to the elimination of the high "offset" by means of the direct subtraction of the detector currents. Errors that occur in conventional circuits have been reduced substantially to zero because all additional error sources, such as different preamplifications, have now been eliminated. Further, the direct formation of the complete information contained in both signals by the difference and the sum of the signals from both detectors is another advantage of the invention.

Although the invention has been described with reference to specific example embodiments, it will be appreciated, that it is intended to cover all modifications and equivalents within the scope of the appended claims.

What we claim is:

1. A circuit arrangement for forming the difference and the sum of first and second detected signals, comprising a first detector ($D_2$) and a second detector ($D_3$) connected to each other in back-to-back fashion for forming a junction (J), a first operational amplifier ($_{PI}$) connected with its input to said junction (J) to directly form a difference signal from currents representing said first and second detected signals and flowing through said first and second detectors ($D_2-D_3$), a second operational amplifier ($O_{PII}$) connected with its input to said first detector ($D_2$) for inverting and amplifying said first detected signal to provide an inverted and amplified signal, a third operational amplifier ($O_{PIII}$) connected with its input to said second detector ($D_3$) for supplying said second detected signal to said third operational amplifier ($O_{PIII}$), said second and third operational amplifiers virtually short-circuiting said first and second detectors ($D_2$, $D_3$) to ground, and resistor means ($R_4$) connecting an output of said second operational amplifier ($O_{PII}$) to said input of said third operational amplifier ($O_{PIII}$) for forming said sum from said inverted and amplified signal and from said second detected signal.

2. The circuit arrangement of claim 1, wherein each of said second and third operational amplifiers comprises a further resistor means ($R_2$, $R_3$) connected in parallel to the respective operational amplifier, said further resistor means ($R_2$, $R_3$) having each the same value, and the same value as said first mentioned resistor means ($R_4$), thus $R_2=R_3=R_4$.

3. The circuit arrangement of claim 1, wherein each of said first and second detectors comprises a respective photosensitive diode.

4. The circuit arrangement of claim 1, wherein said first operational amplifier also comprises a parallel resistor means ($R_1$) corresponding to the desired output range of the difference signal said parallel resistor means being independent of $R_2$, $R_3$, $R_4$.

* * * * *